Patented June 20, 1939

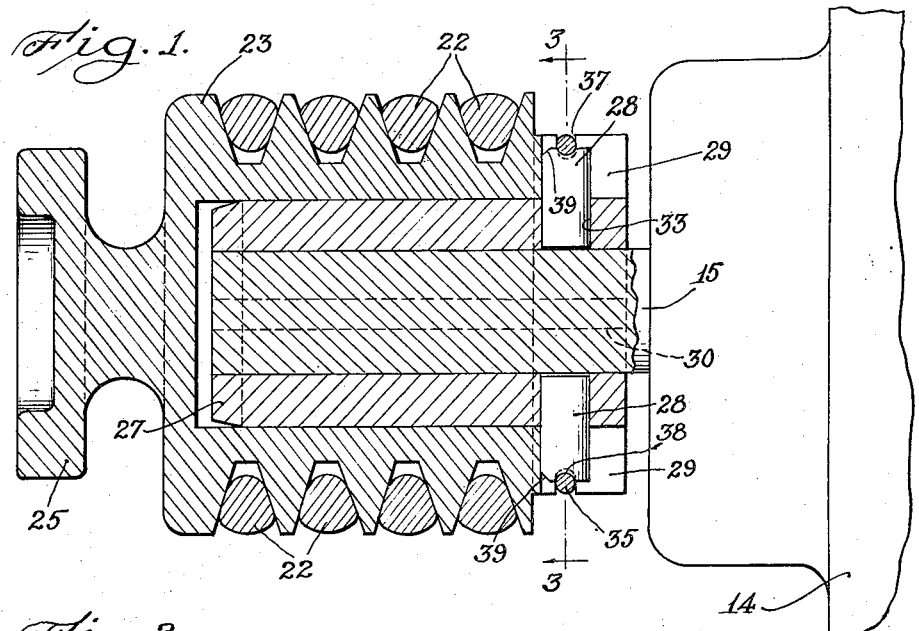
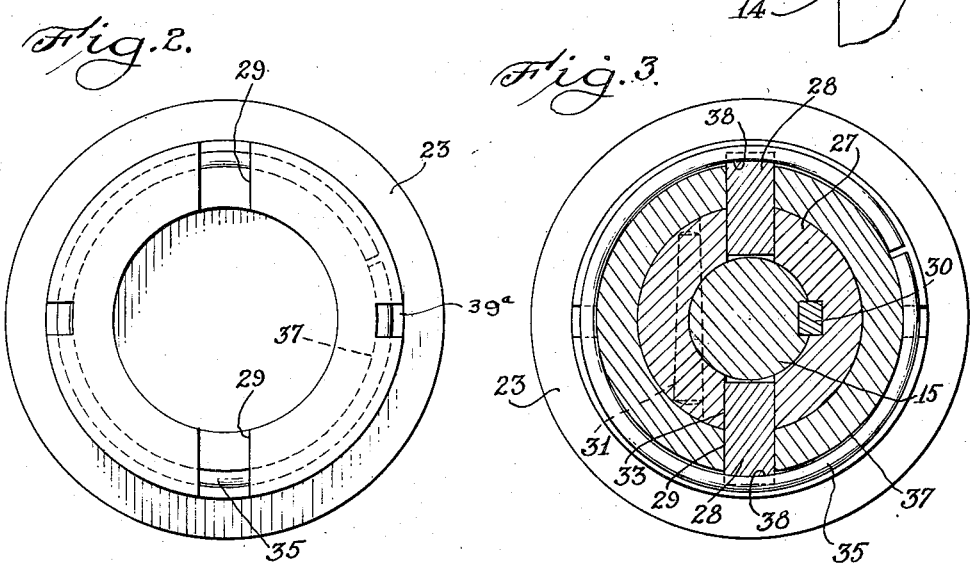

2,162,772

UNITED STATES PATENT OFFICE 2,162,772

VARIABLE SPEED DRIVE MECHANISM

George J. Blum, Chicago, Ill., assignor to Armstrong-Blum Mfg. Co., Chicago, Ill., a corporation of Illinois Application April 8, 1936, Serial No. 73,278

6 Claims. (Cl. 287—53)

This invention pertains to a power transmission mechanism, and more particularly to belt drive mechanism of the type in which changes in speed are effected by the substitution of sheaves of different sizes.

The primary object of my invention is to facilitate the operation of substituting sheaves in a drive mechanism of the character set forth.

Another object is to provide a readily releasable rotary power transmission device in which a rotary transmission element is held against rotation relative to its shaft by radially projecting means; and a novel connection between the radially projecting means and the transmission element holds the latter in axial position on the shaft but permits manual removal and replacement of the transmission element.

Other objects and advantages will become apparent from the following description taken in connection with the accompanying drawing, in which:

Fig. 1 is a longitudinal sectional elevational view principally in section of a transmission device embodying the principles of the invention.

Fig. 2 is a rear end view of the rotary transmission element of the device shown in Fig. 1.

Fig. 3 is a sectional view taken substantially along line 3—3 of Fig. 1.

While the invention is susceptible of various modifications and alternative constructions, I have shown in the drawing and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

I have herein shown, by way of illustration, a practical embodiment of the invention in a transmission of the multiple belt type wherein power from a prime mover 14, such as a suitable electric motor having a drive shaft 15, is transmitted to mechanism (not shown) to be driven as by a plurality of belts 22 engaging over a driving sheave 23 mounted upon the shaft 15 and also engaging over a driven sheave (not shown).

A change in the transmission speed ratio between the driving and driven sheaves is commonly effected in the present type of apparatus by the substitution for one of the sheaves of a sheave of different diameter. This operation has heretofore been slow and laborious, and my invention therefore concerns a novel and advantageous mounting of one of the sheaves, herein the driving sheave 23, such that a change in speed may be effected quickly, without the use of tools and with a minimum loss of operating time.

To this end, I have provided an improved mounting for the driving sheave 23, of such character that when the belts 22 are under proper tension the sheave is effectually retained in position on the shaft 15, and when such tension is slackened, the sheave is readily removable by the application of an axial force to the sheave, which is herein provided for this purpose with a coaxial knob 25.

In the present embodiment of my invention, the sheave 23 is removably mounted on the shaft 15 through the medium of a sleeve or bushing 27 fast on the shaft, and has a quick detachable driving connection with the shaft through the medium of transverse pins 28 projecting radially from the bushing and engaging in diametrically opposed notches 29 in the inner end of the sheave. The bushing is held against rotation relative to the shaft by a longitudinal key 30 and against relative axial movement by a transverse key 31.

By this construction, when the sheave is to be engaged with or disengaged from the shaft, it is merely necessary to move the sheave axially of the shaft. To hold the sheave against axial movement and yet permit of easy substitution, I provide a yieldable retaining means comprising in this instance an annular spring clip 35 fitting within an outwardly opening annular groove 37 in the periphery of the inner end of the sheave and engageable with grooves or notches 38 in the outer ends of the pins 33, the bottom of the groove 37 being disposed radially inward of the notches 38 in the pins. Desirably, the forward edges of the pins adjacent the notches are beveled as at 39 so as to cause the retaining spring 35 to spread upon engagement with the pins with a movement which is transverse to the axis of the pulley as the latter is forced rearwardly against the pins. To facilitate removal of the srping 35, the inner end of the sheave may be provided with notches 39ª (Fig. 2).

In operation, the tension of the driving belts 22, being at right angles to the axis of the sheave 23, tends to hold it against axial movement on its shaft 15. This tendency, it will be observed, I have utilized through the provision of the yieldable retaining means, which while permitting easy application and removal of the sheave when free from restraint by the belts 22, is at the same time entirely effective in cooperation with the tensioning force of the belts.

From the foregoing it will be apparent that the present invention affords a new and improved belt drive mechanism greatly facilitating the making of changes in speed from time to time as may be desired through the substitution of sheaves of different diameters. Moreover, the construction is very simple so as to be susceptible of economical manufacture.

I claim as my invention:

1. In a power transmission mechanism of the character set forth, in combination, a rotary transmission element and means providing a quick detachable driving connection between the element and a shaft, comprising a part rigid with one end of the element and having a notch opening endwise thereof and a peripheral groove extending transversely of the notch, a radial pin arranged to be rigid with the shaft and engaging in said notch, and an annular spring clip seated in said groove, said pin having a recess in its outer end adapted to receive said clip.

2. Power transmission mechanism of the character set forth comprising, in combination, a sleeve to be mounted rigidly with a shaft, a rotary element slidably supported on the sleeve, said element having an annular portion encircling the sleeve and having a radial notch therein opening endwise of the element, a pin rigid with the sleeve and projecting into said notch, and a spring detent on said end portion of the element coacting with the outer end of the pin to hold the element against axial sliding movement on the sleeve.

3. A power transmission mechanism of the character set forth comprising, in combination, a sleeve to be fixed rigidly upon a shaft, a power transmission element slidably supported on the sleeve, said element having an annulus encircling the sleeve and having a radial notch therein opening endwise of the annulus and a peripheral groove extending transversely of the notch, a pin rigid with the sleeve projecting into said notch and having a recess in its outer end, and an annular spring clip seated in said groove and coacting with the recess in the end of the pin to hold the element against axial sliding movement on the sleeve.

4. A power transmission device of the character set forth comprising, in combination, an axially bored transmission element adapted to be removably mounted by an axially sliding motion upon the end of a rotary shaft, said element having a hand grip at its outer end and a recess at the opposite end to receive therein a rigid member projecting radially from the shaft to hold the element against rotation relative to the shaft, and a retaining device on said element for yieldable engagement with the holding member and releasable by the application of an axial pulling force applied to the element through the hand grip.

5. In a rotary power transmission mechanism, a shaft having a projecting end portion, a sleeve mounted on said projecting end portion of the shaft and held against axial and rotational movement relative thereto, a member rigid with the sleeve at one end thereof and projecting radially therefrom, a power transmission element adapted to fit slidably over said sleeve and having an inner end portion recessed to receive said member in positive driving relation therewith, and means for yieldably connecting said rigid member and said power transmission element and thus holding said element against axial movement relative to the sleeve but permitting removal and replacement of said element by force applied manually to effect yielding of said connecting means.

6. In a power transmission device of the character described adapted to be applied to one end of a rotary shaft having a radially projecting rigid member located inwardly from said one end, a rotary element adapted to be slidably mounted upon said one end of the shaft and having a rearwardly opening radial recess therein to receive the projecting member to be held thereby for rotation with the shaft, and means engageable with said member for holding said rotary element in axial position on the shaft but permitting manual removal of said rotary element.

GEORGE J. BLUM.